US012502359B2

United States Patent
Lefevre et al.

(10) Patent No.: US 12,502,359 B2
(45) Date of Patent: Dec. 23, 2025

(54) USE OF OCTENYL-SUCCINATE STARCHES AS A BINDER IN WET GRANULATION

(71) Applicant: ROQUETTE FRERES, Lestrem (FR)

(72) Inventors: Philippe Lefevre, Haverskerque (FR); Olaf Haeusler, Fletre (FR); Nicolas Descamps, Sainghin-en-Melantois (FR); Gregory Le Bihan, Annezin (FR)

(73) Assignee: Roquette Freres, Lestrem (FR)

( * ) Notice: Subject to any disclaimer, the term of this patent is extended or adjusted under 35 U.S.C. 154(b) by 726 days.

(21) Appl. No.: 17/755,758

(22) PCT Filed: Nov. 6, 2020

(86) PCT No.: PCT/EP2020/081384
§ 371 (c)(1),
(2) Date: May 6, 2022

(87) PCT Pub. No.: WO2021/089846
PCT Pub. Date: May 14, 2021

(65) Prior Publication Data
US 2022/0409546 A1    Dec. 29, 2022

(30) Foreign Application Priority Data
Nov. 8, 2019 (EP) .................................. 19306458

(51) Int. Cl.
*A61K 9/20* (2006.01)

(52) U.S. Cl.
CPC .......... *A61K 9/2095* (2013.01); *A61K 9/2059* (2013.01)

(58) Field of Classification Search
CPC ............................. A61K 9/2095; A61K 9/2059
See application file for complete search history.

(56) References Cited

U.S. PATENT DOCUMENTS

| | | | |
|---|---|---|---|
| 2008/0171083 A1 | 7/2008 | Staniforth et al. | |
| 2013/0309394 A1 | 11/2013 | Tsujihata et al. | |
| 2014/0023712 A1 | 1/2014 | Helgason et al. | |

FOREIGN PATENT DOCUMENTS

| | | | | |
|---|---|---|---|---|
| CN | 104086661 A | 10/2014 | | |
| CN | 106538811 A | 3/2017 | | |
| EP | 0499648 A1 | * 8/1992 | | |
| WO | WO-2005099674 A1 | * 10/2005 | ............. | A61K 47/36 |
| WO | WO-2015144983 A1 | * 10/2015 | ............. | C08B 30/12 |

OTHER PUBLICATIONS

Pharmaceutical Blending and Mixing; www.scribd.comdocument506077876Pharmaceutical-Blending-and-Mixing-2015; the book is a large file and could not be attached to this office action; (accessed Dec. 2024) (Year: 2015).*
Wet granulation; Google Search (accessed Dec. 2024) (Year: 2024).*
Common wet granulation techniques; Google Search (accessed Dec. 2024) (Year: 2024).*
Sweedman et al.; Structure and physicochemical properties of octenyl succinic anhydride modified starches: A review; Elsevvier; Carbohydrate Polymers 92 (2013) 905-920 (Year: 2013).*
Ntawukulilyayo et al., "Low substituted N-octenylsuccinate starch as a dissolution rate enhancer in solid dosage forms," International Journal of Pharmaceutics, vol. 91, Issue 1, Apr. 5, 1993, pp. 23-27.
Chief Editor, Guan Zhiyu: "Chapter V. Excipients for Solid Preparation," Excipients and Packaging Materials for Pharmaceutical Preparation, Beijing: China Medical Science Press, Jan. 2017. (Partial English translation included.).
Ntawukuli Lyayo J D, et al., "Low substituted N-octenylsuccinate starch as a dissolution rate enhancer in solid dosage forms", International Journal of Pharmaceutics, Elsevier, NL, vol. 91, No. 1. Apr. 5, 1993 (Apr. 5, 1993), pp. 23-27, XP025557928, ISSN: 0378-5173, DOI: 10.1016/0378-5173(93)90417-E [retrieved on Apr. 5, 1993] the whole document.
P J Cullen, et al., "Pharmaceutical Blending and Mixing, First Edition. Edited by", Jan. 1, 2015 (Jan. 1, 2015), XP055691894, Retrieved from the Internet: URL: https://onlinelibrary.wiley.com/doi/pdf/10.1002/9781118682692.ch8 [retrieved on May 6, 2020] the whole document.

* cited by examiner

*Primary Examiner* — Robert A Wax
*Assistant Examiner* — John W Lippert, III

(57) ABSTRACT

The present invention relates to the use of octenyl succinate starch, in particular sodium octenyl succinate starch as a binder in wet granulation, in particular for pharmaceutical solid dosage form and the granule obtainable by the method thereof.

35 Claims, 4 Drawing Sheets

USE OF OCTENYL-SUCCINATE STARCHES AS A BINDER IN WET GRANULATION

TECHNICAL FIELD

The present invention relates to the use of octenyl succinate starch, in particular sodium octenyl succinate starch as a binder in wet granulation, in particular for pharmaceutical solid dosage form and the granule obtainable by the method thereof.

BACKGROUND ART

Wet granulation is widely used in the pharmaceutical industry due to its versatility and reliability in achieving the desire granule properties. Wet granulation can be applied to all drugs and is considered as a universal way to produce tablets.

Wet granulation is a process in which powders are agglomerated by adding a granulating liquid to form granules. Wet granulation improves flow, compactability to form tablets, content uniformity, generates uniform particle size and shape, and minimizes the impact of minor changes in drug substance and excipient properties.

It can be practiced as a low-shear technique, high-shear process or fluid bed granulation. Recently, wet granulation process improvements have involved continuous processing in particular twin-screw extrusion.

To ensure good adhesion and cohesion between interparticules surface in the wet state, binders with appropriate properties are added. Appropriate binder is important to obtain good plasticity, compactibility and binding ability after the granules are dried and size reduced.

Binders that are commonly used are synthetic polymers, such as semi-synthetic cellulose derivatives, vinyl pyrrolidone derivatives or natural polymers such as pregelatinized starch, starch hydrolysates, gelatin, sodium alginate.

Although, several binders have been studied, it remains a need to find a binder with an improved ability to produce strong, non-friable tablets which fully disintegrate upon exposure to fluids within a short period of time (2.5 to 10 min) to improve bioavailability.

SUMMARY OF THE INVENTION

The inventors studied the properties of different starch derivatives and found that the use of octenyl-succinate starch having a weight average molecular weight (Mw) chosen within the range of $10^4$ to $10^7$ g/mol, preferably of $10^5$ to $10^6$ g/mol, still preferably of 100 000 to 500 000 g/mol, still preferably of 100 000 to 400 000 g/mol, still preferably of 100 000 to 300 000 g/mol still preferably of 100 000 to 200 000 g/mol, again still preferably 150 000 g/mol produces a pharmaceutical product with a high hardness which is no sensitive to the moisture and which can disintegrate within a short period of time. Moreover, low viscosity of the binder solution allows good spraying abilities during wet granulation. Finally, the low surface tension of this binder is more effective for binder penetration for hydrophobic substance.

In a first embodiment, the invention relates to a method for preparing granules comprising one or several substances by wet granulation comprising the steps of: a) wetting powder of substances with a granulation liquid in presence of a binder consisting of octenyl succinate starch having a weight average molecular weight comprised between $10^4$ and $10^7$ g/mol, preferably $10^5$ and $10^7$ g/mol, still preferably $10^5$ and $10^6$ g/mol, still preferably 100 000 and 500 000 g/mol, still preferably 100 000 and 400 000 g/mol, still preferably 100 000 and 300 000 g/mol, still preferably 100 000 and 200 000 g/mol, again still preferably 150 000 g/mol in order to obtain granules and, b) drying said granules. In a particular embodiment, said method comprises the steps of: a1) mixing substance powder with powder of said binder, a2) wetting said powder mixture of step a1) with a granulation liquid consisting of solvent, and c) drying said granules. In another particular embodiment, said substance powder in step a) is wetted with a granulation liquid which comprises said binder. In this particular embodiment, granulation liquid comprising said binder can be sprayed onto the substances powder. Said granulation liquid comprising said binder has preferably a viscosity comprised between 10 and $10^3$ mPa·s. The method as previously described further comprises a step c) of milling the dried granules. In a preferred embodiment, said octenyl succinate starch is a waxy maize octenyl succinate starch, more preferably said octenyl succinate starch content is between 1 and 50%, preferably 1 and 15% by weight of the total dry weight of said granules. In a particular embodiment, said substance is a pharmaceutical active agent.

In another aspect, the invention relates to a method for preparing pharmaceutical tablets comprising the steps of preparing granules as previously described and a final step of compressing the granules in order to obtain tablets.

The invention also relates to a granule comprising one or several substances and an octenyl succinate starch having a weight average molecular weight comprised between $10^4$ and $10^7$ g/mol, preferably $10^5$ and $10^7$ g/mol, still preferably $10^5$ and $10^6$ g/mol, still preferably 100 000 and 500 000 g/mol, still preferably 100 000 and 400 000 g/mol, still preferably 100 000 and 300 000 g/mol, still preferably 100 000 and 200 000 g/mol, again still preferably 150 000 g/mol, and a pharmaceutical tablet comprising said granule. Finally, the invention also relates to the use of octenyl succinate starch having a weight average molecular weight comprised between $10^4$ and $10^7$ g/mol, preferably $10^5$ and $10^7$ g/mol, still preferably $10^5$ and $10^6$ g/mol, still preferably, 100 000 and 500 000 g/mol, still preferably 100 000 and 400 000 g/mol, still preferably 100 000 and 300 000 g/mol still preferably 100 000 and 200 000 g/mol, again still preferably 150 000 g/mol as a binder for wet granulation.

BRIEF DESCRIPTION OF THE DRAWINGS

Other features, details and advantages will be shown in the following detailed description and on the figures, on which.

DETAILED DESCRIPTION OF THE INVENTION

Figure 1:
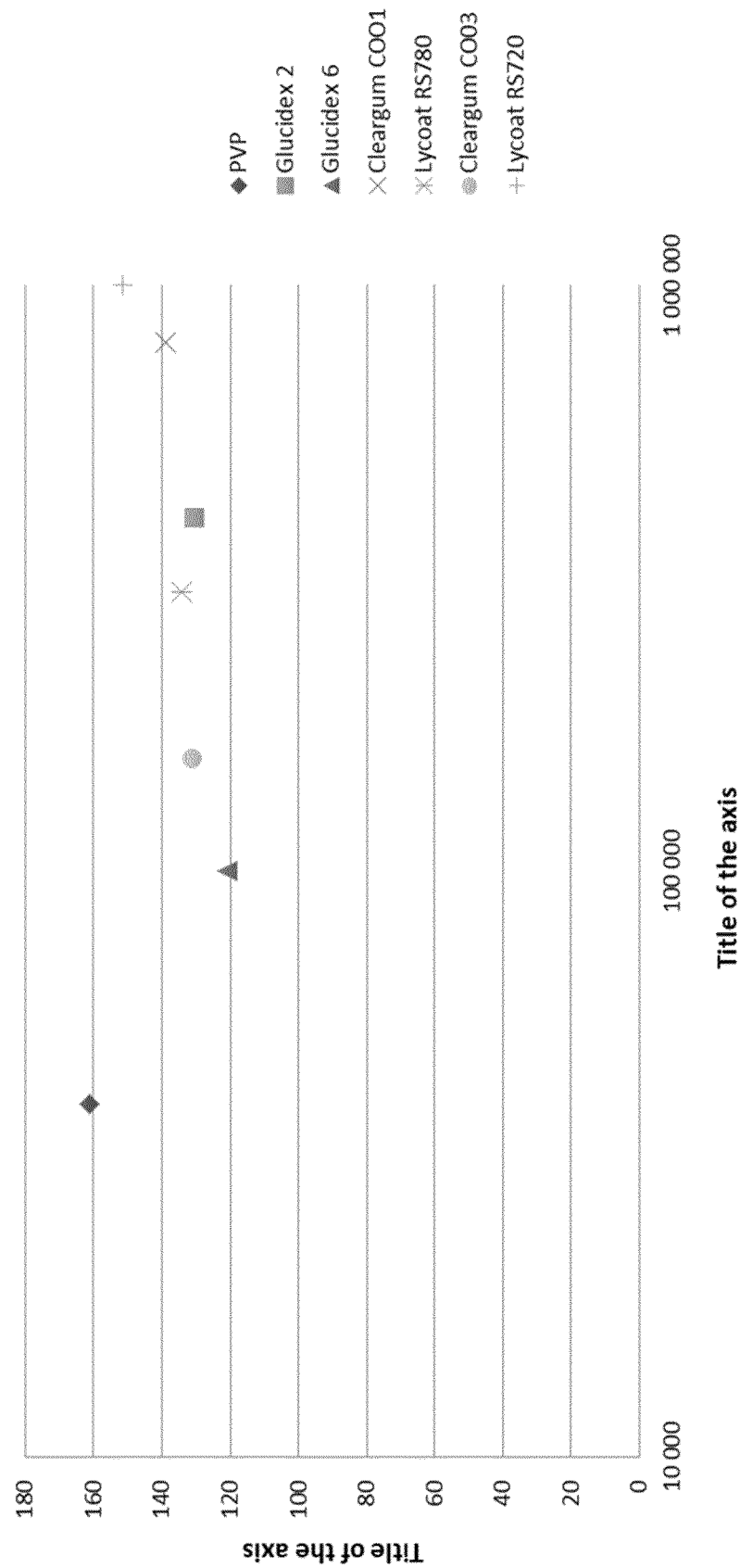
FIG. 1. The tablet hardness is measured according to the weight average molecular weight (Mw) of the binders used for the preparation of the tablets by wet granulation. Binders were used at 3% by weight of the tablet mass. Granulated powders were stored at 50% relative humidities (RH) prior to compression. Compression force is 15 kN.

The inventors evaluated the binder efficiencies of different modified starches types and traditional binders in wet granulation of mannitol. They showed that octenyl succinate starch having an average weigh molecular weight comprised between $10^4$ and $10^7$ g/mol, preferably 100 000 and 500 000 g/mol, still preferably 100 000 and 400 000 g/mol, still preferably 100 000 and 300 000 g/mol, still preferably 100 000 and 200 000 g/mol, again still preferably 150 000 g/mol is particularly effective to produce strong tablets and granules.

The present invention relates to a method for preparing granules comprising one or several substances by wet granulation comprising the steps of: a) wetting substances powder with a granulation liquid in presence of a binder consisting of octenyl succinate starch having an average molecular weight comprised between $10^4$ and $10^7$ g/mol, preferably $10^5$ and $10^7$ g/mol, still preferably $10^5$ and $10^6$ g/mol, still preferably 100 000 and 500 000 g/mol, still preferably 100 000 and 400 000 g/mol, still preferably 100 000 and 300 000 g/mol, still preferably 100 000 and 200 000 g/mol, again still preferably 150 000 g/mol in order to obtain granules and b) drying said granules.

The term "granule" refers to agglomerate made of primary particles. The granules can be obtained by different methods in particular granulation. The granules can be obtained by wet granulation where granulation liquids are used to agglomerate powders. The granules may have any suitable size, preferably in the range from 0.1 to 2 mm.

The term "substances" refer to any compounds of interest. The particular nature of the compound is not critical and any substance may be employed. In a particular embodiment, said substance is an active substance.

The active substance employed herein comprises non-pharmaceutical and pharmaceutical agent. The term "active" is typically used to refer to any substance of interest, for example, pharmaceutical, veterinary, food, nutraceutical, cosmetic or agrochemical. Examples of such active substances are pharmaceutical active ingredients, colorants, flavours. Preferably, the active substance of the invention is a pharmaceutical active agent, preferably intended for humans. The pharmaceutical active agent, may be chemical molecules, but also so-called "biological" active ingredients, as is the case for example with active substance based on or derived from proteins, nucleic acids—such as those derived from DNA or RNA—cells or viruses.

The substances can be initially milled in order to produce a uniform distribution of the substances referring as substances powder. The substances can also be directly purchased in powder form.

The substances powder can be homogenized with excipients powder. Said excipient is selected to ensure the delivery of a consistent amount of substances in a convenient unit dosage form and to optimize the cost, ease and reliability of the manufacturing process. The excipients can be fillers (or diluents), disintegrants, lubricants, anti-adherents, glidants, wetting and surface active agents, stabilizers, pigments, flavoring agents, sweeteners, adsorbents, and taste-maskers.

The powder of substances is then wetted with a granulation liquid in presence of a binder. The substances can be granulated using dry or wet addition method of the binders.

The binder is a critical formulation component with appropriate surface wetting to ensure adhesion and cohesion between substances powders in granules in wet granulation process.

The binder according to the invention is octenyl succinate starch, preferably sodium octenyl succinate starch.

The binder according to the disclosure presents low surface tension. In a preferred embodiment, the binder solution in water (30% w/w) has a surface tension measured with Wilhelmy plate at 23° C. with the method disclosed in the examples lower than 45, preferably 40 mN/m.

The octenyl succinate starch of the disclosure is a starchy material. The expression "starchy material" classically refers to a substance obtained from starch. It is reminded that the expression "starch" classically refers to the starch isolated from any suitable botanical source such as maize, tapioca, barley, by any technique well known to those skilled in the art. Isolated starch typically contains no more than 3% of impurities; said percentage being expressed in dry weight of impurities with respect to the total dry weight of isolated starch. These impurities typically comprise proteins, colloidal matters and fibrous residues. Suitable botanical source includes for instance legumes, cereals, and tubers.

Octenyl succinate starches are well known to those skilled in the art. Octenyl succinate starches are typically obtainable by esterification, for instance from the reaction of a starchy material with octenyl succinic anhydride.

In a preferred embodiment, the octenyl succinate starch according to the disclosure is further partially hydrolyzed, preferably with alpha-amylase.

In a preferred embodiment, the octenyl succinate starch according to the disclosure is derived from starch comprising more than 50% of amylopectin, expressed as dry weight relative to the total dry weight of said starch. This amylopectin content can be classically determined by the person skilled in the art by way of potentiometric analysis of iodine absorbed by amylose to form a complex. In a preferred embodiment, the octenyl succinate starch according to the disclosure is derived from starch exhibiting an amylopectin content of at least 60%, still preferably of at least 80%, still preferably of at least 90%, still preferably of at least 95%.

In a preferred embodiment, the octenyl succinate starch according to the disclosure is derived from waxy starch, even more preferably from waxy maize starch.

In a preferred embodiment, the octenyl succinate starch according to the disclosure is sodium octenyl succinate starch.

In a preferred embodiment, the octenyl succinate starch according to the disclosure has a Brookfield viscosity selected within the range of from 10 to 1000 mPa·s; said viscosity being determined on a solution comprising 24% dry weight of said octenyl succinate starch with respect to the total weight of the solution, at 20° C., after 20 min at 60 rpm using a SC4-18 spindle. More preferably, this viscosity is selected within the range of from 20 to 300 mPa·s, still preferably in the range 20 to 150 mPa·s.

The octenyl succinate starch according to the disclosure might undergo other chemical and/or physical modification than the preferred ones exposed before, as long as it does not interfere with the desired properties, notably in term of safety and efficiency of the final powder. However, and because it appears that it is not necessary in the present invention, the octenyl succinate starch of the invention is preferably no further modified.

As example of suitable octenyl succinate starches commercially available, mention may be made of the ones marketed under the name CLEARGUM® CO01 (ROQUETTE) or CLEARGUM® CO03 (ROQUETTE). In a preferred embodiment, CLEARGUM® CO01 has a Brookfield viscosity selected within the range from 90 to 200 mPa·s and CLEARGUM® CO03 has a brookfield viscosity in the range from 20 to 100 mPa·s.

The use of octenyl succinate with weight average molecular weight (Mw) comprised between $10^4$ and $10^7$ g/mol as binder yield to strong tablets which disintegrate within a short period of time to improve bioavailability. According to the invention, said octenyl succinate starch has a weight average molecular weight of between $10^4$ and $10^7$ g/mol, preferably $10^5$ and $10^7$ g/mol, still preferably $10^5$ and $10^6$ g/mol, again still preferably 100 000 and 500 000 g/mol, still preferably 100 000 and 400 000 g/mol, still preferably 100 000 and 300 000 g/mol, still preferably 100 000 and 200 000 g/mol, more preferably 150 000 g/mol. In a preferred embodiment, said octenyl succinate starch is CLEARGUM® CO 01 (CAS N° 66829-29-6, Roquette) or CLEARGUM® CO 03 (CAS N° 66829-29-6; Roquette), more preferably CLEARGUM® CO 03 (CAS N° 66829-29-6; Roquette).

The weight average molecular weight can be determined by the person skilled in the art by dissolving the sample in elution solvent consisting of aqueous 0.1 mol/L sodium nitrate (Merck ref.: 6546) solution containing 0.02% sodium azide (Aldrich ref. 19.993-1) filtered on a 0.02 micron filter (degassed HPLC-grade water) and analyzed with size exclusion chromatography, equipped with a MALS-Detector. The MW—distribution is recorded, the mean value of the complete weight distribution is calculated. As a non-limiting example, the high performance liquid chromatography unit is equipped with a high pressure isocratic pump (WATERS 515 type), an autosampler (WATER 717+ type), a differential refractometer (WATERS 2414-type), a column oven, a multi-angle static light scattering (MALS)-Detector (DAWN HELEOS II (WYATT)). In a preferred embodiment, the analysis is realized with an injected volume of 100 μL and a mobile phase output of 0.5 mL/min, a temperature of 40° C. during 110 minutes. A normalization step is performed by preparing a normalization sample by adding 10 mL of elution solvent to 40 mg of Pullulan P50 Shadex standard kit P82 (Waters-ref. WATO34207) and incubating during 30 min at 100° C. with low stirring. 100 μL of the resulting solution is analyzed with said size exclusion chromatography. The sample is then prepared by adding 10 mL of elution solvent to 100 mg of the sample and incubating during 30 min at 100° C. and analyzed with said size exlusion chromatography. The molecular weight is calculated with Astra software.

In a particular embodiment, said octenyl succinate starch is present at a concentration comprised between 0, 1 and 50%, preferably 1 and 10%, more preferably 3% by weight of the total dry weight of said granules.

In a first particular embodiment, the substances are granulated using dry addition of the binders. In this particular method, the binder consisting of octenyl succinate starch as previously disclosed in powder form is mixed with the substance powder. The resulting powder mixture is then wetted with a granulation liquid. In this case, the granulation liquid is a solvent preferably selected from the group consisting of water, organic solvents such as ethanol, isopropanol, methanol, acetone and a mixture thereof, preferably a mixture comprising at least 50% of water, more preferably said granulation liquid is water. Said granulation liquid must be volatile to be easily removed by drying. Thus, in the case of dry addition of the binders, the substances powder is mixed with powder of binder prior to be wetted with a granulation liquid.

In another particular embodiment, the substances are granulated using wet addition of the binders. In this particular method, the substances powder is wetted with granulation liquid comprising said binder consisting of octenyl succinate starch as previously described. Thus, in another terms, wet granulation is realized by wetting substances powder with a binder solution as granulation liquid. In this particular embodiment, said granulation liquid is prepared by dissolving octenyl succinate starch as previously described in a solvent. Said solvent must be volatile to be easily removed by drying. Preferably, said solvent is selected from the group consisting of water, organic solvent such as ethanol, isopropanol, methanol, acetone and a mixture thereof, preferably a mixture comprising at least 50% of water, more preferably said granulation liquid is water.

In a preferred embodiment, the granulation liquid comprising said octenyl succinate starch has a Brookfield viscosity at 25° C. comprised between 50 and 300 mPa·s, preferably 50 and 150 mPa·s, more preferably 74 mPa·s Viscosity was measured with a Brookfield Digital Viscometer DV-I with a rotation speed was 100 rpm.

Said granulation liquid can be poured or sprayed over the dry powder of substances, in particular in a granulator. The powder contained in the chamber is typically mixed by applying shear or by fluidizing the powder mixture to form granules.

Said granulation can be performed in a fluidized bed granulators or a high shear granulator, preferably high shear granulator such as a laboratory Mixer Granulator Diosna P1-6 with a 6 liter bowl. Said high shear granulator preferably comprises a mixing bowl, impeller and chopper. Usually the impeller runs at a speed of 200 to 1500 rpm and the rotation speed of a chopper is between 10 to 2200 rpm.

The granulation liquid is typically added over time, in a time rage comprised between 5 seconds to 15 minutes with continuous mixing.

Finally, the granules may be dried using common techniques known by a person skilled in the art with appropriate moisture content, preferably a loss-on-drying value between 0 to 20% by weight of water, more preferably 1 to 3% by weight of water. Drying is preferably conducted at a temperature comprised between 20 and 120° C., preferably 60° C. during 10 to 180 minutes in a fluid bed. The water content is measured using the Sartorius moisture analyzer MA150 at a drying temperature of 120° C. with the automatic mode.

The dried granules can be submitted to a milling step to obtain an appropriate particle size distribution for the subsequent processes, preferably granule size in a range from 20 to 1500 μm determined by laser diffraction. Preferably, the sizing step is achieved using a low shear screening mill, such as U5 Comil with a 800 μm sieve.

The dried granules can then be prepared in a solid dosage form, for example for oral administration. Solid dosage forms include tablets, capsules, pills, troches, cachets, and the like.

Thus, the present invention also relates to a method for preparing pharmaceutical tablet wherein the resulting granules obtained by the method as previously described are compressed into a tablet. In another embodiment, the dried granules are enclosed in a capsule.

Lubricant can be added before compression step to facilitate tablet ejection. As used herein, the term "lubricant" refers to any pharmaceutically acceptable agent which reduces surface friction, lubricates the surface of the granule, decreases tendency to build-up of static electricity, and/or reduces friability of the granules. Preferably, said lubricant is magnesium stearate.

Preferably, the compression step is performed by way of a tablet press, for instance by way of a single-punch press or rotary tablet press, preferably by way of a rotary tablet press.

Preferably, the compression step is performed by way of a tablet press, for instance by way of a single-punch press or rotary tablet press, preferably by way of a rotary tablet press Preferably, the compression step is realised with a machinery which typically contains two steel punches within a steel die cavity. The tablet is formed when pressure is exerted on the dried granules by the punches in the cavity.

The present disclosure also relates to a granule obtainable by the method for preparing granules of substances as previously described. Said granule comprises one or several substances and a binder as previously described.

Preferably, the granule according to the invention has a bulked density of at least 100 g/L, preferably selected within the range of from 400 to 800 g/L, more preferably selected within the range of from 500 to 700 g/L.

Preferably, the granule according to the invention has a tapped density of at least 100 g/L, preferably selected within the range of from 600 to 1000 g/L, more preferably selected within the range of from 700 to 900 g/L.

These bulk and tapped densities can typically be determined by the person skilled in the art according to the method described in the examples.

In another aspect, the present invention relates to a pharmaceutical tablet obtainable by the method for preparing the tablet as previously described. Said pharmaceutical tablet comprises a granule as previously described. In another embodiment, said pharmaceutical tablet comprise one or several substances and a binder as previously described.

Preferably, the pharmaceutical tablet according to the invention exhibits a disintegration time lower than 60 minutes, preferably lower than 15 minutes, more preferably from 2 to 7 minutes. The disintegration time might be determined by the person skilled in the art according to method described in examples.

Preferably, the pharmaceutical tablet according to the invention has friability lower than 1%. The friability might be determined by the person skilled in the art according to method described in example.

Preferably, the pharmaceutical tablets according to the invention exhibit hardness higher at 15 kN compression force higher than 50N, preferably higher than 100, more preferably from 110 to 150N. The hardness might be determined by the person skilled in the art according to method described in examples.

Other characteristics and advantages of the present invention will emerge clearly on reading the examples given hereinafter, which illustrate the invention without however limiting it.

EXAMPLES

1. Materials and Methods
A. Granulation Matrix

In the following granulation trials, the following products were tested as binders:

TABLE 1 list of the binders used in the experiments.

| Ref. | Binder |
| --- | --- |
| PVP | PolyVinylPyrolidone (KOLLIDON ® 30, BASF) |
| MTX_1 | Maltodextrin derived from waxy maize starch (GLUCIDEX ® 2, Roquette) |
| MTX_3 | Maltodextrin derived from waxy maize starch (GLUCIDEX ® 6, Roquette) |
| OS _1 | octenyl succinate starch derived from waxy maize starch (CLEARGUM ® CO01, Roquette) |
| OS _2 | octenyl succinate starch derived from waxy maize starch (CLEARGUM ® CO03, Roquette) |
| HP/H _1 | Cold-water soluble hydroxypropylated hydrolyzed starch derived from pea (LYCOAT ® RS720, Roquette) |
| HP/H _2 | Cold-water soluble hydroxypropylated hydrolyzed starch derived from pea (LYCOAT ® RS780, Roquette) |

The weight average molecular weight were determined by dissolving the sample in elution solvent consisting of aqueous 0.1 mol/L sodium nitrate (Merck ref.: 6546) solution containing 0.02% sodium azide (Aldrich ref 19.993-1) filtered on a 0.02 micron filter (degassed HPLC-grade water) and analyzed with size exclusion chromatography, equipped with a MALS-Detector. The MW—distribution is recorded, the mean value of the complete weight distribution is calculated. As a non-limiting example, the high performance liquid chromatography unit is equipped with a high pressure isocratic pump (WATERS 515 type), an autosampler (WATER 717+ type), a differential refractometer (WATERS 2414-type), a column oven, a multi-angle static light scattering (MALS)-Detector (DAWN HELEOS II (WYATT)). In a preferred embodiment, the analysis is realized with an injected volume of 100 μL and a mobile phase output of 0.5 mL/min, a temperature of 40° C. during 110 minutes. A normalization step is performed by preparing a normalization sample by adding 10 mL of elution solvent to 40 mg of Pullulan P50 Shadex standard kit P82 (Waters-ref. WAT034207) and incubating during 30 min at 100° C. with low stirring. 100 μL of the resulting solution is analyzed with said size exclusion chromatography. The sample is then prepared by adding 10 mL of elution solvent to 100 mg of the sample and incubating during 30 min at 100° C. and analyzed with said size exlusion chromatography. The molecular weight is calculated with Astra software.

The powder to be granulated was composed of mannitol (PEARLITOL® 50C, Roquette)

The binders were used at 3% by weight for a total of 1.5 kg powder (mannitol and binder).

The binder solutions to get 3% of binder in the tablet were prepared by dissolving 45 g of dry binder listed in the Table 1 respectively in 150 g of water (Table 2).

TABLE 2 preparation of binder solution

| % of binder in the tablet | 3% |
|---|---|
| Binder | 45 g |
| Water | 150 g |

The viscosities of the binder solutions were determined with the Brookfield Digital Viscometer DV-I at 25° C. The rotation speed was 100 rpm.

B. Method of Preparation of Powder and Tablets.

1. Wet Granulation

High shear wet granulation was done using a Laboratory Mixer granulator Diosna P1-6 with a 6 liters bowl. The mannitol is mixed to break the agglomerates in the Diosna bowl (6 L) for 5 minutes at an impeller speed of 250 rpm and a chopper speed of 1800 rpm. The binder solution is added by spraying on the powder still summited to shearing. The powder is mixed during 5 minutes to produce granules with appropriate size.

The quantity of mannitol and binder used are indicated in Table 3 below:

TABLE 3

Quantity of mannitol and binder used for granulation.

| % of binder in the tablet | 3% |
|---|---|
| Weight of Mannitol | 1.455 Kg |
| Weight of binder | 45 g |

The granulation is followed using In Touch and Hist data software. The granules are then dried in the Aeromatic Fielder AG with circulating hot air at 60° C.

The size of granulates is then calibrated with U Comil with a 800 µm a mesh screen and a speed of 2500 rpm.

2. Powder Preconditioning

Once the granulates are calibrated, they are separated in three fractions of same weight and stored for one week in HPP110 constant climate chamber with 30%, 50% or 60% of relative humidity at 25° C.

3. Tableting

After 1 week pre-conditioning, the granules are compressed in order to form the tablets. Prior to the compression step, the lubrication is carried out by mixing the powder and the magnesium stearate at 1.2% by weight for 5 min at 34 rpm in a cycloidal turbula mixer.

The tablets of 400 mg are prepared using a Korsch XP1 tablet press with 10 mm diameter and 9 mm concavity punches. Compression forces used are 5, 10, 15, 20 and 25 KN. For each compression force, 80 tablets are produced with a tablet output of 20 tablets/min.

C. Characterisation

1. Binder Solution

As the efficiency of a binder is partly due to surface tension and spreading on the powder, the binder solutions were analysed. The surface tension γLv (mN/m) of each binder solution is measured with the tensiometer KRÜSS K12 using the Krüss standard plate (Wilhelmy plate, width: 19.9 mm—thickness: 0.2 mm—height 10 mm) made of rough platinium. Measurements were performed at 23° C. by using a thermoregulated cell. Prior to measurement, the plate must be decontaminated thanks to a flame (gas fired burner). Method parameters are the following: detection speed of 6 mm/min, detection sensitivity of 0.01 g, immersion depth of 2 mm.

2. Granules

The size of particles is analysed by a MALVERN 3000 granulometer with powder module aero s using standard venture disperser and a dispersion pressure of 0 bar. The optical model used is the Fraunhofer diffraction model. Results are expressed in % by volume.

The poured and tapped densities are calculated from volume measurements of 100 g of powders. The poured density is obtained by pouring 100 g of powder into a graduated cylinder as described in the European pharmacopeia. The tapped density is obtained by tapping the previous sample 2500 times using to the Stampfvolumeter STAV 2003 tapping machine.

3. Tablet

The hardness, friability and time of disintegration of the tablets are measured. The friability is measured with a friabilimeter ERWEKA TAR220. The rotation speed is programmed at 25 rpm for 4 minutes and the friability is measured with the following formula:

$$\text{Friability} = \frac{m \text{ initial} - m \text{ final}}{m \text{ initial}} \times 100$$

The hardness of ten tablets is measured with 8M tablet hardness tester (Pharmatron AG).

The disintegration time is measured using the DisiTest50 Pharmatron. In this method, 6 tablets are dipped in 900 ml of distilled water at 37° C. A tablet is considered as disintegrated when it is not detected any more by the machine.

Results

1. Binders Characteristic

Table 4 below presents the characteristics of the binders and the binder solutions at 23% dry weight as used for granulation trials. It shows clearly that octenyl succinate starches present much lower surface tension than other binder solutions. This low surface tension will induce a good spreadability of the solution on hydrophobic surfaces such as hydrophobic powder of active ingredients. These characteristics thus give octenyl succinate starches very good advantages as a powder granulations binder.

TABLE 4

Characteristics of the binders and the binder solutions at 23% dry weight as used for granulation trials

| Ref. | Binder | Mw (g/mol) | Viscosity of 23% dry weight solution, 25° C. (mPa · s) | Surface tension of the solution (23% dry weight at 23° C.) |
|---|---|---|---|---|
| PVP | PolyVinylPyrolidone (KOLLIDON ® 30, BASF) | 40 000 | 55 | 64.58 |
| MTX_1 | Maltodextrin derived from waxy maize starch (GLUCIDEX ® 2, Roquette) | 400 000 | 64 | 69.3 |

TABLE 4-continued

Characteristics of the binders and the binder solutions at 23% dry weight as used for granulation trials

| Ref. | Binder | Mw (g/mol) | Viscosity of 23% dry weight solution, 25° C. (mPa · s) | Surface tension of the solution (23% dry weight at 23° C.) |
|---|---|---|---|---|
| MTX_3 | Maltodextrin derived from waxy maize starch (GLUCIDEX ® 6, Roquette) | 100 000 | 35 | 69.45 |
| OS _1 | octenyl succinate starch derived from waxy maize (CLEARGUM ® CO01, Roquette) | 600 000 | 132 | 39.65 |
| OS _2 | octenyl succinate starch derived from waxy maize (CLEARGUM ® CO03, Roquette) | 150 000 | 74 | 39.47 |
| HP/H _1 | Cold-water soluble hydroxypropylated hydrolyzed starch derived from pea (LYCOAT ® RS720, Roquette) | 1 000 000 | 904 | 52.14 |
| HP/H _2 | old-water soluble hydroxypropylated hydrolyzed starch derived from pea (LYCOAT ® RS780, Roquette) | 300 000 | 156 | 51.61 |

2. Tablet Hardness Depending on Binder Molecular Weight (50% RH-15 KN)

FIG. 1 represents the tablet hardness as a function of the binder molecular weight. Prior to compression, granules were equilibrated at 50% RH. The compression force used is 15 kN.

As shown in the FIG. 1, the hardness of tablets made with starch derivative binders depends on the molecular weight of the binder: the higher it is, the harder the tablet is. According to those results, the four best starch derivatives in term of tablet hardness are CLEARGUM® CO01, CLEARGUM® CO03, LYCOAT® RS720 and LYCOAT® RS 780.

3. Tablet Compression Profile Depending on the Binder

Figure 2:
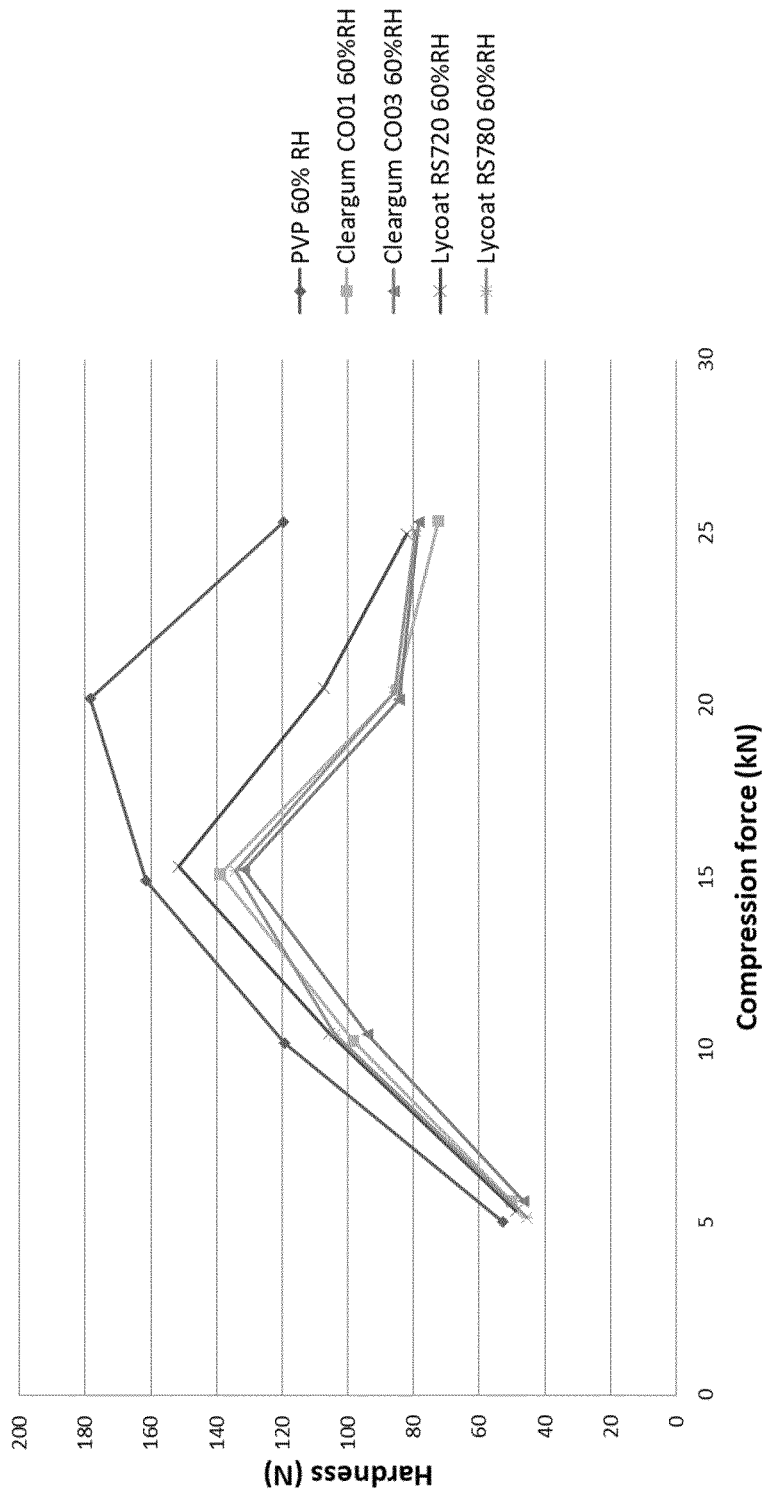
FIG. 2. Tablet hardness is measured according to the compression force used to prepare tablets with different binders. Binders were used at 3% by weight of the tablet mass. Granulated powders were stored at 60% relative humidities (RH) prior to compression.

FIG. 2 presents the compression profiles of mannitol powder granulated with the four best starch derivatives and PVP. Prior to compression, granulates were stored at 60% RH for 1 week.

It can be seen on FIG. 2 that CLEARGUM® CO01, CLEARGUM® CO03 and LYCOAT® RS 780 present very similar compression profiles with a hardness value between 130N and 140N obtained at 15 kN compression force. LYCOAT® RS 720 and PVP appear here to give slighter hardness at the same compression force with respectively about 150N and 160N.

Generally speaking, all granules compressed here present good compression profiles covering a wide range of hardness.

4. Moisture Impact on Hardness

Figure 3:
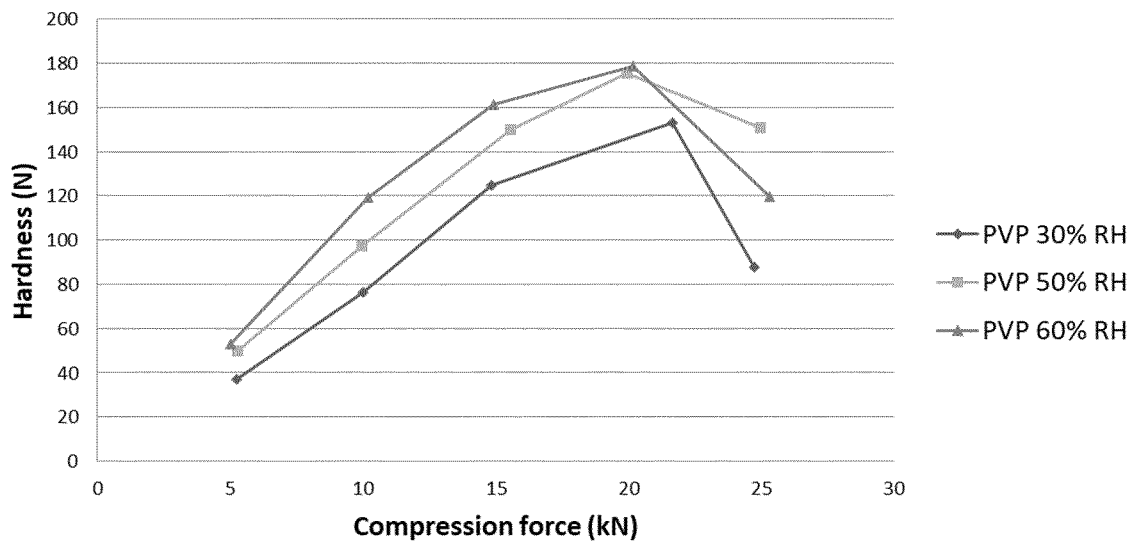
FIG. 3. Moisture impact on hardness tablet when PVP is used as a binder. Tablet hardness is measured according to the compression force used to prepare the tablets with PVP as binder. PVP was used at 3% by weight of the tablet mass. Granulated powders were stored at several relative humidities (30%, 50% and 60% RH) prior to compression.
Figure 4:
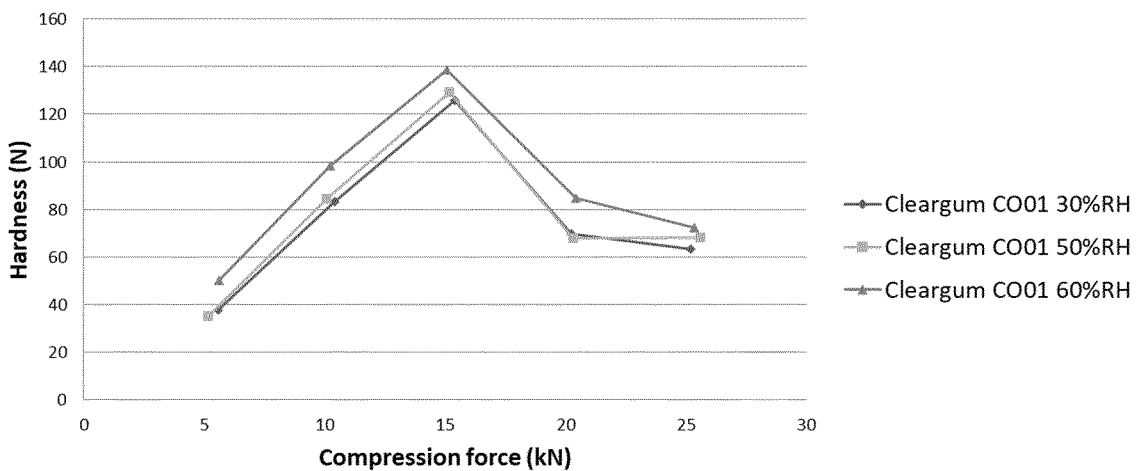
FIG. 4. Moisture impact on hardness tablet when CLEARGUM CO01 is used as a binder. Tablet hardness is measured according to the compression force used to prepare the tablets with CLEARGUM CO01 as binder. CLEARGUM CO01 was used at 3% by weight of the tablet mass. Granulated powders were stored at several relative humidities (30%, 50% and 60% RH) prior to compression.
Figure 5:
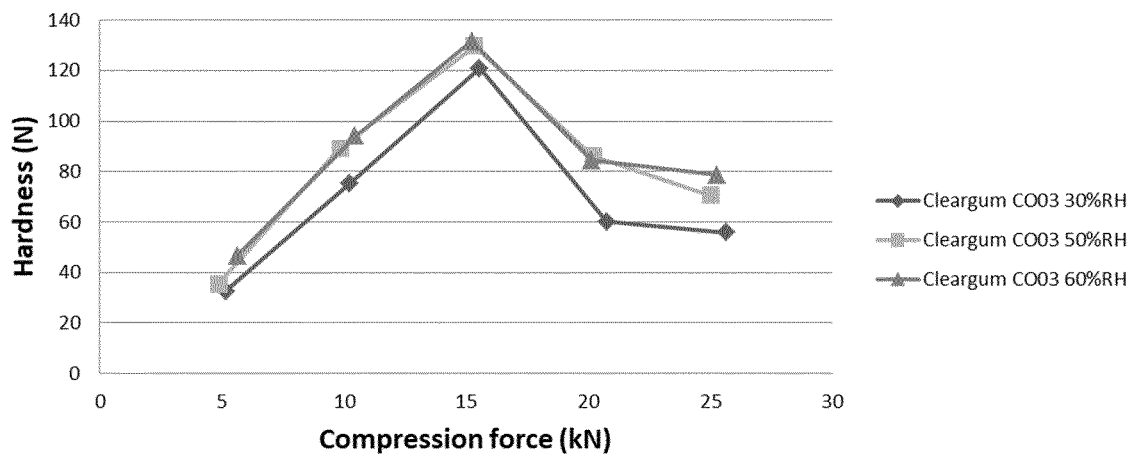
FIG. 5. Moisture impact on hardness tablet when CLEARGUM CO03 is used as a binder. Tablet hardness is measured according to the compression force used to prepare the tablets with CLEARGUM CO03 as binder. CLEARGUM CO03 was used at 3% by weight of the tablet mass. Granulated powders were stored at several relative humidities (30%, 50% and 60% RH) prior to compression.

FIGS. 3, 4 and 5 show the compression profiles of mannitol respectively granulated with PVP, CLEARGUM® CO01 and CLEARGUM® CO03. All powders were preconditioned 1 week at 3 different relative humidities (30%, 50% and 60% RH) before compression.

Contrary to granules made with CLEARGUM CO01 or CLEARGUM CO03, it clearly appears that the compression behaviour of granules made with PVP is very sensitive to the preconditioning conditions.

Actually, the hardness of tablets containing PVP presents changes of more than 36N at 15 kN compression force over the relative humidity range studied. This variation represents between 23% and 29% of the hardness value.

At the same compression force of 15 KN and for the same relative humidity range, the hardness of tablets containing CLEARGUM® CO01 and CLEARGUM® CO03 presents changes of 13N and 11N respectively. These variations represent between 8% and 10% of the hardness value.

The better stability regarding humidity conditions of storage obtained with octenyl succinate starches is a clear advantage since it enables to guarantee the sustainability of the properties of granules and tablets.

5. Friability and Disintegration Time

All tablets prepared in this study present friability values of less than 1% in the measurement conditions.

Figure 6:
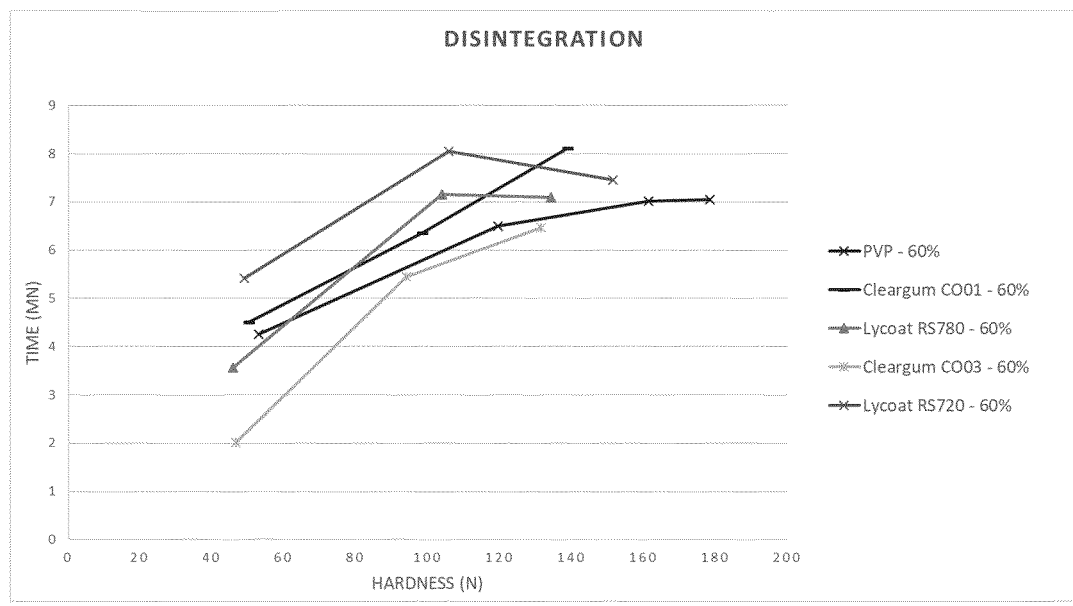
FIG. 6: Disintegration time measured according to the hardness of tablets prepared with different binders. Binders were used at 3% by weight of the tablet mass. Granulated powders were stored at 60% RH prior to compression.

The time of disintegration of the tablets prepared with different binders in water is presented in FIG. 6. Cleargum CO03 granulated tablets shows the lowest time of disintegration. This behaviour is advantageous 6. Conclusion This study compared the capability of mannitol granulated with either CLEARGUM® CO01, CLEARGUM® CO03, LYCOAT® RS720, LYCOAT® RS 780 or PVP to form tablets. It appeared that mannitol granulated with all those binders is able to form tablets with good compression profile and very low friability.

However, it was highlighted that, contrary to octenyl succinate starches, tablets made with PVP present high variations of hardness depending on the storage relative humidity of the granules. This thus makes those starch derivative binders much more appropriate to guarantee the stability of granulated formulations.

In addition, the low surface tension measured on octenyl succinate starches solutions is a huge advantage since this will induce a better spreadability of the solutions on hydrophobic surfaces such as hydrophobic powder of active ingredients.

CLEARGUM CO01 and CLEARGUM CO03 thus appear here as being the best granulation binders. Among those two starch derivatives, CLEARGUM CO03, with its lower molecular weight, lower viscosity in solution and lower disintegration time of tablet, is the best compromise.

The invention claimed is:

1. A method for preparing granules comprising one or several substances by wet granulation comprising the steps of:
   a) wetting powder of substances with a granulation liquid in presence of a binder consisting of partially hydrolyzed waxy octenyl succinate starch having a weight average molecular weight from $10^4$ to $10^6$ g/mol in order to obtain granules and,
   b) drying said granules,
   wherein said partially hydrolyzed waxy octenyl succinate starch is a waxy octenyl succinate that as been partially hydrolyzed with an alpha-amylase.

2. The method of claim 1 wherein the step a) comprises the steps of:
   a1) mixing substance powder with powder of said binder,
   a2) wetting said powder mixture of step a1) with a granulation liquid consisting of a solvent.

3. The method of claim 1 wherein said substances powder in step a) is wetted with a granulation liquid which comprises said binder.

4. The method of claim 3 wherein said granulation liquid comprising said binder is sprayed onto the substances powder.

5. The method of claim 3 wherein said granulation liquid comprising said binder has a Brookfield viscosity from 10 to $10^3$ mPa·s. as measured at 25° C. using a Brookfield Digital Viscometer DV-I at 100 rpm.

6. The method according to claim 1 further comprising a step c) of milling the dried granules.

7. The method according to claim 1 wherein said partially hydrolyzed octenyl succinate starch is a partially hydrolyzed waxy maize octenyl succinate starch.

8. The method according to claim 1 wherein said partially hydrolyzed octenyl succinate starch content is between 1 and 50% by weight of the total dry weight of said granules.

9. The method according to claim 1 wherein said substance is a pharmaceutical active agent.

10. A method for preparing pharmaceutical tablets exhibiting a disintegration time lower than 60 minutes comprising the steps of preparing granules according to claim 1 and a final step of compressing the granules in order to obtain tablets.

11. A granule comprising one or several substances and a partially hydrolyzed waxy octenyl succinate starch having a weight average molecular weight from $10^4$ to $10^6$ g/mol, wherein said partially hydrolyzed waxy octenyl succinate starch is a waxy octenyl succinate that has been partially hydrolyzed with an alpha-amylase.

12. A pharmaceutical tablet exhibiting a disintegration time lower than 60 minutes comprising a granule of claim 11.

13. A method of binding a substance powder in a wet granulation process, the method comprising:
   providing partially hydrolyzed waxy octenyl succinate starch having a weight average molecular weight comprised between $10^4$ and $10^6$ g/mol; and
   using the octenyl starch as a binder in the wet granulation process, wherein said partially hydrolyzed waxy octenyl succinate starch is a waxy octenyl succinate that has been partially hydrolyzed with an alpha-amylase.

14. The method of claim 1, wherein the partially hydrolyzed waxy octenyl succinate starch has a weight average molecular weight from $10^4$ to $10^5$ g/mol.

15. The method of claim 1, wherein the partially hydrolyzed waxy octenyl succinate starch has a weight average molecular weight from $10^5$ to $10^6$ g/mol.

16. The method of claim 1, wherein the partially hydrolyzed waxy octenyl succinate starch has a weight average molecular weight from 100,000 to 500,000 g/mol.

17. The method of claim 1, wherein the partially hydrolyzed waxy octenyl succinate starch has a weight average molecular weight from 100,000 to 400,000 g/mol.

18. The method of claim 1, wherein the partially hydrolyzed waxy octenyl succinate starch has a weight average molecular weight from 100,000 to 300,000 g/mol.

19. The method of claim 1, wherein the partially hydrolyzed waxy octenyl succinate starch has a weight average molecular weight from 100,000 to 200,000 g/mol.

20. The method of claim 1, wherein the partially hydrolyzed waxy octenyl succinate starch has a weight average molecular weight of 150,000 g/mol.

21. The method of claim 1, wherein said partially hydrolyzed octenyl succinate starch content is from 1 to 15% by weight of the total dry weight of said granules.

22. The granule of claim 11, wherein the partially hydrolyzed waxy octenyl succinate starch has a weight average molecular weight from $10^4$ to $10^5$ g/mol.

23. The granule of claim 11, wherein the partially hydrolyzed waxy octenyl succinate starch has a weight average molecular weight from $10^5$ to $10^6$ g/mol.

24. The granule of claim 11, wherein the partially hydrolyzed waxy octenyl succinate starch has a weight average molecular weight from 100,000 to 500,000 g/mol.

25. The granule of claim 11, wherein the partially hydrolyzed waxy octenyl succinate starch has a weight average molecular weight from 100,000 to 400,000 g/mol.

26. The granule of claim 11, wherein the partially hydrolyzed waxy octenyl succinate starch has a weight average molecular weight from 100,000 to 300,000 g/mol.

27. The granule of claim 11, wherein the partially hydrolyzed waxy octenyl succinate starch has a weight average molecular weight of from 100,000 to 200,000 g/mol.

28. The granule of claim 11, wherein the partially hydrolyzed waxy octenyl succinate starch has a weight average molecular weight of 150,000 g/mol.

29. The method of claim 13, wherein the partially hydrolyzed waxy octenyl succinate starch has a weight average molecular weight from $10^4$ to $10^5$ g/mol.

30. The method of claim 13, wherein the partially hydrolyzed waxy octenyl succinate starch has a weight average molecular weight from $10^5$ to $10^6$ g/mol.

31. The method of claim 13, wherein the partially hydrolyzed waxy octenyl succinate starch has a weight average molecular weight from 100,000 to 500,000 g/mol.

32. The method of claim 13, wherein the partially hydrolyzed waxy octenyl succinate starch has a weight average molecular weight from 100,000 to 400,000 g/mol.

33. The method of claim 13, wherein the partially hydrolyzed waxy octenyl succinate starch has a weight average molecular weight from 100,000 to 300,000 g/mol.

34. The method of claim 13, wherein the partially hydrolyzed waxy octenyl succinate starch has a weight average molecular weight from 100,000 to 200,000 g/mol.

35. The method of claim 13, wherein the partially hydrolyzed waxy octenyl succinate starch has a weight average molecular weight of 150,000 g/mol.

* * * * *